United States Patent
Roeland et al.

(10) Patent No.: US 9,906,912 B2
(45) Date of Patent: Feb. 27, 2018

(54) CONTROLLING COMMUNICATION MODE OF A MOBILE TERMINAL

(71) Applicant: TELEFONAKTIEBOLAGET LM ERICSSON (PUBL), Stockholm (SE)

(72) Inventors: Dinand Roeland, Sollentuna (SE); Lasse Olsson, Stora Höga (SE); Zoltán Turányi, Szentendre (HU)

(73) Assignee: TELEFONAKTIEBOLAGET LM ERICCSON (PUBL), Stockholm (SE)

( * ) Notice: Subject to any disclaimer, the term of this patent is extended or adjusted under 35 U.S.C. 154(b) by 0 days.

(21) Appl. No.: 15/034,427

(22) PCT Filed: Jun. 4, 2015

(86) PCT No.: PCT/EP2015/062515
§ 371 (c)(1),
(2) Date: May 4, 2016

(87) PCT Pub. No.: WO2016/192804
PCT Pub. Date: Dec. 8, 2016

(65) Prior Publication Data
US 2016/0381573 A1    Dec. 29, 2016

(51) Int. Cl.
*H04W 4/02* (2018.01)
*H04W 88/06* (2009.01)
(Continued)

(52) U.S. Cl.
CPC .............. *H04W 4/028* (2013.01); *H04W 8/26* (2013.01); *H04W 52/0209* (2013.01);
(Continued)

(58) Field of Classification Search
CPC . H04W 24/02; H04W 4/028; H04W 52/0209; H04W 88/06
(Continued)

(56) References Cited

U.S. PATENT DOCUMENTS 6,339,595 B1 *  1/2002  Rekhter .............. H04L 12/4645
                                              370/392
6,463,061 B1 * 10/2002  Rekhter .............. H04L 12/4645
                                              370/392
(Continued)

FOREIGN PATENT DOCUMENTS

WO    2006061692 A2    6/2006
WO    2014124682 A1    8/2014
WO    2015005853 A2    1/2015

OTHER PUBLICATIONS

International Search Report and Written Opinion dated Feb. 11, 2016, in International Application No. PCT/EP2015/062515, 14 pages.

*Primary Examiner* — Hai V Nguyen
(74) *Attorney, Agent, or Firm* — Rothwell, Figg, Ernst & Manbeck, p.c.

(57) ABSTRACT

The invention relates to methods and network nodes of controlling a communication mode of a mobile terminal in a mobile service chaining network, and managing a registered Internet Protocol (IP) address for a mobile terminal.
In a first aspect of the invention, a method performed by at least one control plane node of controlling a communication mode of a mobile terminal in a mobile service chaining network is provided. The method comprises setting the mobile terminal in idle mode and submitting an instruction to at least one Internet Protocol Advertisement Point (IAP) serving the mobile terminal to invalidate context for the mobile terminal held by the at least one IAP, wherein the at least one IAP invalidates at least a registered Internet Protocol (IP) address used for the mobile terminal.

31 Claims, 9 Drawing Sheets

(51) Int. Cl.
    *H04W 52/02*     (2009.01)
    *H04W 8/26*      (2009.01)
    *H04W 76/04*     (2009.01)
(52) U.S. Cl.
    CPC .......... *H04W 76/046* (2013.01); *H04W 88/06* (2013.01); *Y02B 60/50* (2013.01)
(58) Field of Classification Search
    USPC ........................................ 455/552.1, 554.2
    See application file for complete search history.

(56) References Cited

U.S. PATENT DOCUMENTS

| | | | | |
|---|---|---|---|---|
| 6,526,056 | B1* | 2/2003 | Rekhter | H04L 12/4645 370/392 |
| 6,816,912 | B1* | 11/2004 | Borella | H04W 76/022 370/328 |
| 7,154,889 | B1* | 12/2006 | Rekhter | H04L 12/4645 370/392 |
| 7,245,917 | B2* | 7/2007 | Chiueh | H04W 36/14 370/352 |
| 7,307,990 | B2* | 12/2007 | Rosen | H04L 12/4645 370/392 |
| 7,369,556 | B1* | 5/2008 | Rekhter | H04L 12/465 370/392 |
| 7,403,475 | B1* | 7/2008 | Saxena | H04L 45/22 370/228 |
| 7,630,392 | B2* | 12/2009 | Raza | H04L 45/02 370/312 |
| 7,668,166 | B1* | 2/2010 | Rekhter | H04L 12/4645 370/392 |
| 7,760,745 | B2* | 7/2010 | Qureshi | H04L 45/04 370/315 |
| 7,782,882 | B2* | 8/2010 | Qureshi | H04L 29/12792 370/252 |
| 7,805,382 | B2* | 9/2010 | Rosen | G06Q 10/10 705/321 |
| 7,809,355 | B2* | 10/2010 | Mohanty | H04W 8/26 455/411 |
| 7,826,405 | B2* | 11/2010 | Shin | H04L 29/12283 370/328 |
| 7,826,478 | B2* | 11/2010 | Zhao | H04W 76/04 370/465 |
| 7,916,721 | B1* | 3/2011 | Breau | H04W 8/26 370/389 |
| 7,937,479 | B2* | 5/2011 | Blatherwick | H04L 29/12094 709/227 |
| 7,953,103 | B2* | 5/2011 | Raza | H04L 45/02 370/242 |
| 7,970,911 | B2* | 6/2011 | Blatherwick | H04W 4/02 709/227 |
| 8,102,848 | B1* | 1/2012 | Rao | H04L 45/16 370/253 |
| 8,139,475 | B2* | 3/2012 | Vercellone | H04L 41/0663 370/216 |
| 8,195,162 | B2* | 6/2012 | Lee | H04W 36/0055 370/331 |
| 8,199,669 | B2* | 6/2012 | Nishida | H04W 8/08 370/254 |
| 8,218,502 | B1* | 7/2012 | Liu | H04W 76/022 370/331 |
| 8,264,956 | B2* | 9/2012 | Ramankutty | H04L 45/025 370/228 |
| 8,345,536 | B1* | 1/2013 | Rao | H04L 45/58 370/216 |
| 8,406,147 | B2* | 3/2013 | Zhao | H04W 76/04 370/252 |
| 8,451,799 | B2* | 5/2013 | Yang | H04W 12/06 370/328 |
| 8,521,904 | B1* | 8/2013 | Pei | H04L 41/12 370/255 |
| 8,531,947 | B2* | 9/2013 | Zhao | H04L 29/12216 370/230 |
| 8,533,391 | B2* | 9/2013 | Song | G06F 3/0616 711/103 |
| 8,538,433 | B2* | 9/2013 | Kekki | H04W 48/17 370/310 |
| 8,571,554 | B2* | 10/2013 | Lee | H04W 36/0055 455/436 |
| 8,619,654 | B2* | 12/2013 | Yang | H04W 52/0277 370/252 |
| 8,630,245 | B2* | 1/2014 | Venkatachalam | H04W 12/06 370/329 |
| 8,788,826 | B1* | 7/2014 | Zhao | H04L 29/12283 713/162 |
| 8,842,607 | B2* | 9/2014 | Chan | H04W 8/085 370/328 |
| 8,873,507 | B2* | 10/2014 | Chan | H04W 8/082 370/331 |
| 8,909,766 | B1* | 12/2014 | Hegg | H04L 41/08 709/224 |
| 8,914,005 | B2* | 12/2014 | Wu | H04W 60/06 455/415 |
| 8,949,459 | B1* | 2/2015 | Scholl | H04L 45/04 709/239 |
| 8,964,568 | B2* | 2/2015 | Cherian | H04L 29/12216 370/241 |
| 9,043,409 | B2* | 5/2015 | Swaminathan | H04L 67/16 707/999.006 |
| 9,137,161 | B2* | 9/2015 | Zhang | H04L 47/10 |
| 9,137,165 | B2* | 9/2015 | Anand | H04L 47/125 |
| 9,143,395 | B2* | 9/2015 | Bashandy | H04L 41/0654 |
| 9,191,327 | B2* | 11/2015 | Shieh | H04L 47/125 |
| 9,203,714 | B2* | 12/2015 | Smith | H04L 41/0896 |
| 9,319,324 | B2* | 4/2016 | Beheshti-Zavareh | H04L 47/2408 |
| 9,390,055 | B2* | 7/2016 | Warfield | G06F 15/17331 |
| 9,391,905 | B2* | 7/2016 | Zhang | H04L 47/10 |
| 9,407,540 | B2* | 8/2016 | Kumar | H04L 45/306 |
| 9,432,298 | B1* | 8/2016 | Smith | H04L 49/9057 |
| 9,438,439 | B2* | 9/2016 | Nagaraja | H04L 47/10 |
| 9,444,677 | B2* | 9/2016 | Kumar | H04L 41/0668 |
| 9,491,614 | B2* | 11/2016 | Barrett | H04W 4/005 |
| 9,491,686 | B2* | 11/2016 | Bosch | H04W 40/36 |
| 9,521,103 | B2* | 12/2016 | Li | H04L 51/28 |
| 9,590,901 | B2* | 3/2017 | Tubaltsev | H04L 45/586 |
| 2003/0016672 | A1* | 1/2003 | Rosen | H04L 12/4645 370/392 |
| 2003/0233329 | A1* | 12/2003 | Laraki | G06Q 20/123 705/52 |
| 2005/0053034 | A1* | 3/2005 | Chiueh | H04W 36/14 370/331 |
| 2005/0094616 | A1* | 5/2005 | Sakakura | H04L 29/12132 370/349 |
| 2005/0195773 | A1* | 9/2005 | Popovich | H04W 8/26 370/338 |
| 2005/0222933 | A1* | 10/2005 | Wesby | G06Q 40/00 705/36 R |
| 2005/0289244 | A1* | 12/2005 | Sahu | H04L 67/2819 709/249 |
| 2006/0018290 | A1* | 1/2006 | Zhao | H04W 76/04 370/335 |
| 2006/0229896 | A1* | 10/2006 | Rosen | G06Q 10/10 705/321 |
| 2006/0268681 | A1* | 11/2006 | Raza | H04L 45/02 370/216 |
| 2007/0030855 | A1* | 2/2007 | Ribiere | H04L 12/5692 370/401 |
| 2007/0116224 | A1* | 5/2007 | Burke | H04L 29/06027 379/201.12 |
| 2007/0153763 | A1* | 7/2007 | Rampolla | H04L 41/0806 370/351 |
| 2008/0040777 | A1* | 2/2008 | Aihara | H04L 12/14 726/4 |
| 2008/0095339 | A1* | 4/2008 | Elliott | H04L 12/14 379/93.01 |

(56) References Cited

U.S. PATENT DOCUMENTS

| | | | |
|---|---|---|---|
| 2008/0207181 A1* | 8/2008 | Jiang | H04W 4/14 455/414.1 |
| 2008/0316914 A1* | 12/2008 | Vercellone | H04L 41/0663 370/216 |
| 2009/0073993 A1* | 3/2009 | Qureshi | H04L 45/04 370/401 |
| 2009/0073994 A1* | 3/2009 | Qureshi | H04L 29/12792 370/401 |
| 2009/0177764 A1* | 7/2009 | Blatherwick | H04W 4/02 709/221 |
| 2009/0177782 A1* | 7/2009 | Blatherwick | H04L 29/12094 709/228 |
| 2010/0042546 A1* | 2/2010 | Humbel | G06Q 10/02 705/64 |
| 2010/0074268 A1* | 3/2010 | Raza | H04L 45/02 370/401 |
| 2010/0195621 A1* | 8/2010 | Kekki | H04W 48/17 370/332 |
| 2010/0220656 A1* | 9/2010 | Ramankutty | H04L 45/025 370/328 |
| 2011/0013535 A1* | 1/2011 | Zhao | H04W 76/04 370/252 |
| 2011/0051689 A1* | 3/2011 | Premec | H04W 8/087 370/331 |
| 2011/0072055 A1* | 3/2011 | Swaminathan | H04L 67/16 707/810 |
| 2011/0080872 A1* | 4/2011 | Chan | H04W 8/082 370/328 |
| 2011/0170479 A1* | 7/2011 | Chan | H04W 8/085 370/328 |
| 2011/0242975 A1* | 10/2011 | Zhao | H04L 29/12216 370/230 |
| 2011/0249564 A1* | 10/2011 | Cho | H04L 43/028 370/241 |
| 2011/0280175 A1* | 11/2011 | Yamada | H04W 84/105 370/315 |
| 2011/0292859 A1* | 12/2011 | So | H04W 72/005 370/312 |
| 2012/0099586 A1* | 4/2012 | Cherian | H04L 29/12216 370/389 |
| 2012/0117208 A1* | 5/2012 | Shaffer | H04L 29/12254 709/221 |
| 2012/0207174 A1* | 8/2012 | Shieh | H04L 47/125 370/401 |
| 2012/0271883 A1* | 10/2012 | Montoya | H04W 4/023 709/204 |
| 2013/0031271 A1* | 1/2013 | Bosch | H04W 40/36 709/245 |
| 2013/0121252 A1* | 5/2013 | Peng | H04L 61/106 370/328 |
| 2013/0250803 A1* | 9/2013 | Abraham | H04L 67/16 370/254 |
| 2013/0275529 A1* | 10/2013 | Li | H04L 51/28 709/206 |
| 2013/0329595 A1* | 12/2013 | Scholz | H04L 65/80 370/252 |
| 2014/0025770 A1* | 1/2014 | Warfield | G06F 15/17331 709/213 |
| 2014/0059192 A1* | 2/2014 | Miklos | H04W 8/082 709/221 |
| 2014/0150014 A1* | 5/2014 | Aitken | H04N 21/2381 725/33 |
| 2014/0302874 A1* | 10/2014 | Zakrzewski | H04W 8/22 455/456.1 |
| 2014/0355436 A1* | 12/2014 | Zhang | H04L 47/10 370/232 |
| 2014/0357258 A1* | 12/2014 | Smith | H04L 41/0896 455/423 |
| 2014/0369204 A1* | 12/2014 | Anand | H04L 47/125 370/235.1 |
| 2015/0071285 A1* | 3/2015 | Kumar | H04L 45/306 370/392 |
| 2015/0082372 A1* | 3/2015 | Kottahachchi | H04L 63/08 726/1 |
| 2015/0082373 A1* | 3/2015 | Kottahachchi | H04L 63/08 726/1 |
| 2015/0082396 A1* | 3/2015 | Theebaprakasam | H04L 63/08 726/5 |
| 2015/0109902 A1* | 4/2015 | Kumar | H04L 41/0668 370/219 |
| 2015/0117215 A1* | 4/2015 | Nagaraja | H04L 47/10 370/236 |
| 2015/0163150 A1* | 6/2015 | Beheshti-Zavareh | H04L 45/121 370/400 |
| 2015/0181409 A1* | 6/2015 | Chang | H04W 8/18 455/410 |
| 2015/0223284 A1* | 8/2015 | Jain | H04W 52/0258 370/329 |
| 2015/0263899 A1* | 9/2015 | Tubaltsev | H04L 45/02 370/254 |
| 2015/0263946 A1* | 9/2015 | Tubaltsev | H04L 45/586 370/392 |
| 2015/0264580 A1* | 9/2015 | Iwai | H04W 16/14 370/329 |
| 2015/0296520 A1* | 10/2015 | Batchu | H04W 72/0493 455/434 |
| 2015/0327032 A1* | 11/2015 | Hedman | H04W 76/046 370/329 |
| 2015/0334045 A1* | 11/2015 | Tremblay | H04L 47/783 709/226 |
| 2015/0341276 A1* | 11/2015 | Zhang | H04L 47/10 370/232 |
| 2015/0365324 A1* | 12/2015 | Kumar | H04L 12/4641 370/392 |
| 2015/0382298 A1* | 12/2015 | Muller | H04W 52/0212 370/311 |
| 2016/0028625 A1* | 1/2016 | Hari | H04L 45/74 370/392 |
| 2016/0028851 A1* | 1/2016 | Shieh | H04L 47/125 370/392 |
| 2016/0044567 A1* | 2/2016 | Baghel | H04W 28/08 370/331 |
| 2016/0055490 A1* | 2/2016 | Keren | G06Q 30/00 705/14.47 |
| 2016/0065456 A1* | 3/2016 | Muley | H04L 45/38 370/392 |
| 2016/0150004 A1* | 5/2016 | Hentunen | H04L 67/1036 726/23 |
| 2016/0157056 A1* | 6/2016 | Kim | H04W 4/023 455/414.1 |
| 2016/0188501 A1* | 6/2016 | Chan | G06F 13/1673 710/113 |
| 2016/0212638 A1* | 7/2016 | Jain | H04W 52/0258 |
| 2016/0253689 A1* | 9/2016 | Milton | G06Q 30/0205 705/7.34 |
| 2016/0309369 A1* | 10/2016 | Roeland | H04W 36/0011 |
| 2016/0323237 A1* | 11/2016 | Warfield | G06F 15/17331 |
| 2016/0330245 A1* | 11/2016 | Bell | H04L 63/0823 |
| 2016/0330330 A1* | 11/2016 | Bindrim | H04L 65/1013 |
| 2016/0330610 A1* | 11/2016 | Bindrim | H04L 65/1013 |
| 2016/0330748 A1* | 11/2016 | Bindrim | H04L 65/1013 |
| 2016/0344621 A1* | 11/2016 | Roeland | H04L 45/38 |
| 2016/0345238 A1* | 11/2016 | Roeland | H04W 36/0011 |
| 2016/0366229 A1* | 12/2016 | Yamaura | H04L 67/146 |
| 2017/0041333 A1* | 2/2017 | Mahjoub | H04L 61/1511 |
| 2017/0063632 A1* | 3/2017 | Goliya | H04L 41/12 |
| 2017/0063633 A1* | 3/2017 | Goliya | H04L 41/12 |

* cited by examiner

CONTROLLING COMMUNICATION MODE OF A MOBILE TERMINAL

CROSS REFERENCE TO RELATED APPLICATION(S)

This application is a 35 U.S.C. § 371 National Phase Entry Application from PCT/EP2015/062515, filed Jun. 4, 2015, designating the United States, the disclosure of which is incorporated herein in its entirety by reference.

TECHNICAL FIELD

The invention relates to methods and network nodes of controlling a communication mode of a mobile terminal in a mobile service chaining network, and managing a registered Internet Protocol (IP) address for a mobile terminal. The invention further relates to computer programs and computer program products comprising computer readable medium having the computer programs stored thereon.

BACKGROUND

In today's mobile networks, a mobile terminal such as a smart phone, tablet, smart watch, laptop, etc., commonly referred to as User Equipment (UE) may be either in idle or in connected mode as described e.g. in 3rd Generation Partnership Project (3GPP) specification TS 23.401. Briefly described, when the UE is in connected mode, it is able to send and receive user plane data packets.

In connected mode, the network and the UE have established a radio connection, and the network has reserved resources for the UE. For example, the base station, referred to as an Evolved NodeB (eNodeB), located in an Evolved Universal Terrestrial Radio Access Network (E-UTRAN) of a Long-Term Evolution (LTE) technology communications network, holds UE associations referred to as "UE context" including for instance radio bearer configuration, encryption keys, transport tunnel identifiers, data buffers, etc.

In idle mode, the UE cannot send or receive user plane data packets as network resources for the UE are kept to a minimum. The eNodeB holds no UE context at all, and control signalling between UE and network is kept to a minimum, which saves UE battery consumption.

In the concept of Mobile Service Chaining, Software Data Network (SDN) technology is utilized to intelligently chain service functions so that traffic from each subscriber only traverses a particular set of service functions as defined by a policy for a particular subscriber. For example, an operator can configure a service chaining policy such that only web traffic is sent to a content optimization service.

With Mobile Service Chaining, the traffic path for any arbitrary flow or aggregate of flows can be dynamically changed by simply changing the policy associated with that flow in that an SDN controller automatically programs routers, switches and application servers in the network.

However, in Mobile Service Chaining, the process of switching between idle and connect mode is not applied; rather, the UE is always considered to be connected in Mobile Service Chaining.

SUMMARY

An object of the present invention is to solve, or at least mitigate, this problem in the art and thus to provide improved methods and devices for controlling a communication mode of a mobile terminal in a mobile service chaining network.

This object is attained in a first aspect of the invention by a method performed by at least one control plane node of controlling a communication mode of a mobile terminal in a mobile service chaining network. The method comprises initiating setting the mobile terminal in idle mode and submitting an instruction to at least one Internet Protocol Advertisement Point (IAP) serving the mobile terminal to invalidate context for the mobile terminal held by the at least one IAP, wherein the at least one IAP invalidates at least a registered Internet Protocol (IP) address used for the mobile terminal.

This object is attained in a second aspect of the invention by a method performed by at least one control plane network node of controlling a communication mode of a mobile terminal in a mobile service chaining network. The method comprises receiving a query from at least one IAP serving the mobile terminal to obtain an indication of a current location of the mobile terminal from a Location Registry, LR, based on an Internet Protocol, IP, address of the mobile terminal (10) included in the query and initiating the setting of the mobile terminal in connected mode in response to said query.

This object is attained in a third aspect of the invention by a method performed by an IAP of managing context of a mobile terminal in a mobile service chaining network. The method comprises receiving an indication that context of the mobile terminal should be invalidated upon the mobile terminal (10) being set in idle mode, and invalidating, in response to the received indication, at least a registered IP address used for the mobile terminal.

Correspondingly, the object is attained by devices corresponding to the above mentioned methods of the first, second and third aspect of the invention.

Thus, further provided is a control plane node configured to control a communication mode of a mobile terminal in a mobile service chaining network, which comprises a processing unit and a memory, the memory containing instructions executable by the processing unit, whereby the control plane node is operative to initiate setting of the mobile terminal in idle mode, and to submit an instruction to at least one IAP serving the mobile terminal to invalidate context for the mobile terminal held by the at least one IAP, wherein the at least one IAP invalidates at least a registered IP address used for the mobile terminal.

Further provided is a control plane node configured to control a communication mode of a mobile terminal in a mobile service chaining network, which comprises a processing unit and a memory, said memory containing instructions executable by the processing unit, whereby the control plane node is operative to receive a query from at least one IAP serving the mobile terminal to obtain an indication of a current location of the mobile terminal from an LR based on an IP address of the mobile terminal included in the query, and to initiate setting of the mobile terminal in connected mode in response to the query.

Further provided is an IAP configured to manage context of a mobile terminal in a mobile service chaining network, which comprises a processing unit and a memory, the memory containing instructions executable by the processing unit, whereby the IAP is operative to receive an indication that context of the mobile terminal should be invalidated upon the mobile terminal being set in idle mode, and to invalidate, in response to the received indication, at least an IP address used for the mobile terminal.

This object is attained in a fourth aspect of the invention by a control plane system comprising at least two control plane nodes configured to control a communication mode of a mobile terminal in a mobile service chaining network, each control plane node comprising a processing unit and a memory, the memory containing instructions executable by the processing unit, whereby the control plane system is operative to initiate setting of the mobile terminal in idle mode, and to submit an instruction to at least one IAP serving the mobile terminal to invalidate context for the mobile terminal held by the at least one IAP, wherein the at least one IAP invalidates at least a registered IP address used for the mobile terminal.

Advantageously, for improving the transition of the mobile terminal to idle mode, a control plane (CP) node such as e.g. a Mobility Management Entity (MME) in an LTE network sets the mobile terminal in idle mode and informs one or more IAPs serving the mobile terminal in a mobile service chaining network, which one or more IAPs have the IP address of this particular mobile terminal in its local LR cache, that their respective cache entry should be invalidated. Alternatively, a timer at the IAP(s) indicating a period of inactivity of the mobile terminal expires, whereupon the LAP invalidates its cache entry for the particular IP address. By the invalidation of the IP address, no user plane data can be submitted to the mobile terminal.

The CP contains all control plane logic, allowing for a strict separation between control and user plane. It contains, amongst others, mobility handling such as a Mobility Management Entity (MME) located in a core network known as Evolved Packet Core (EPC) in case of an LTE implementation. The invention may be implemented in a single functional/physical CP node, but may alternatively be distributed over a plurality of CP nodes.

In an embodiment, a single CP node (e.g. an MME) may set the mobile terminal in idle mode (via a base station on which the mobile terminal camps) and then submit an instruction to the IAP(s) serving the mobile terminal to invalidate the registered IP address used for the mobile terminal.

In an alternative embodiment, a first CP node (e.g. an eNodeB) may set the mobile terminal in idle mode, and inform a second CP node (e.g. an MME) that the mobile terminal is set in idle mode, whereupon the second CP node submits an instruction to the IAP(s) serving the mobile terminal to invalidate the registered IP address used for the mobile terminal.

Further advantageously, for improving the transition of the mobile terminal to connected mode, an IAP query to a global LR in the control plane for the IP address of the particular mobile terminal is used as trigger for the CP node to initiate a transition from idle mode to connected mode of the mobile terminal. The IAP query to the global LR indicates that user plane data has been received by the IAP for further transmission to the mobile terminal.

For each downlink packet, the IAP performs the following 1) query the LR based on the destination IP address of the packet in order to retrieve at least device location; 2) tag the packet with a location ID; and 3) forward the packet to the appropriate destination as designated by the tags and/or other header information. In a mobile service chaining network, the packet will transverse one or more UPFs before reaching the mobile terminal, i.e. its final destination.

In an embodiment, the location identifier may be implemented in the form of a base station ID indicating the particular base station to which the mobile terminal is connected. In a further embodiment, if the IP address of the mobile terminal is not enough to identify the mobile terminal, the query also requests a device ID, which subsequently is tagged to the packed along with e.g. the IP address and location ID.

In an embodiment of the invention, the IAP invalidates or removes its cache entry for the IP address of the particular mobile terminal. That is, the device location identifier (e.g. a base station ID) and optionally a device ID of the cache entry associated with this particular IP address is invalidated or removed.

In further embodiments of the invention, the CP node may advantageously submit instructions to other mobile service chaining network elements, such as e.g. User Plane Functions (UPFs), Forward Elements (FEs), base stations and classifiers, to invalidate UE context for the mobile terminal, or at least inform the elements that the mobile terminal is in idle mode. This may advantageously free up storage space and processor capacity. In case of a transition to connected mode, the network elements may be informed accordingly, and/or instructions to re-establish UE context may be submitted.

Further provided are computer programs for causing a device or a system to perform the methods according to the invention, and computer program products comprising computer readable medium having the computer programs stored thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
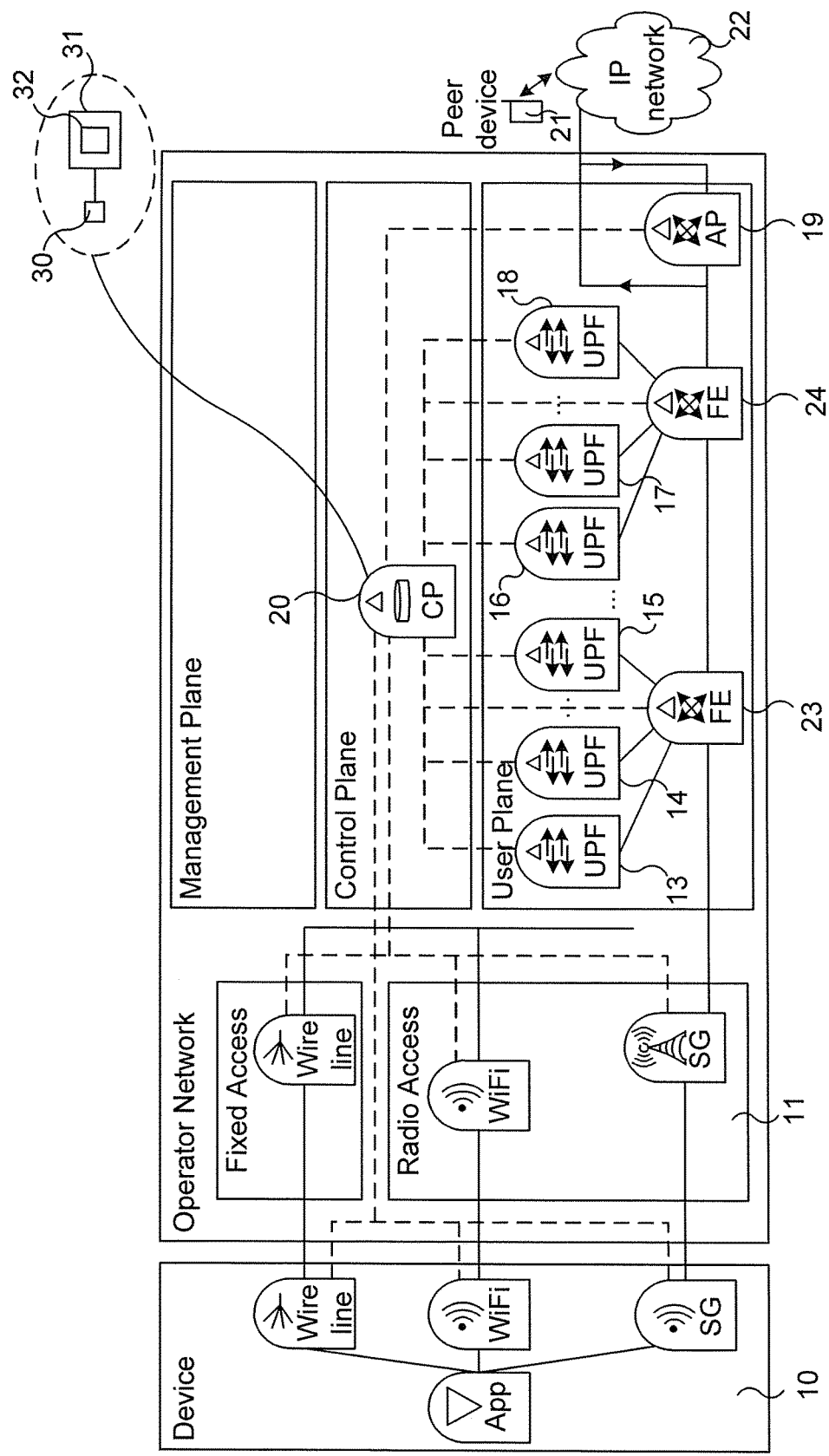
FIG. 1 illustrates a mobile service chaining network in which the invention advantageously may be implemented.

FIG. 1 shows a generic architecture of a mobile service chaining network illustrated as a functional architecture. The functional architecture may run on a platform that may be distributed over multiple sites, like a distributed cloud.

The architecture is divided into a control plane, a user plane and a management plane. Generally speaking, the control plane carries signalling traffic, while the user plane carries data traffic. In FIG. 1, control plane traffic is indicated by means of dashed lines while user plane traffic is indicated by means of continuous lines. The management plane carries operations and administration traffic required for network management and will not be further discussed herein. Further, the control plane is depicted as a single logical element or node 20. However, in an implementation, the CP node 20 may be distributed.

A device 10 communicates with the CP node 20 and the user plane via one or more accesses. An access node will in the following be exemplified as a Base Station (BS) ii, but the concept is equally applicable to all accesses including fixed access.

The CP node 20 contains all control plane logic, allowing for a strict separation between control and user plane. It contains, amongst others, mobility handling such as an MME located in an EPC network in case of an LTE implementation.

The mobile service chaining network illustrated in FIG. 1 comprises User Plane Functions (UPFs) denoted 13-18. A UPF processes user plane packets, which may include altering the packet's payload and/or packet header. UPFs are not expected to know topological information regarding the chain, including which other UPFs are in the chain and how to reach them. A UPF may serve multiple users, and may keep context per user.

The mobile service chaining network may further comprise one or more Forwarding Elements (FEs) 23, 24. An FE forwards each packet to one of its ports based on rules it has received from the CP node 20. An FE may forward a packet through one or more UPFs. An FE is only concerned with the actual forwarding; it does not classify or modify a packet.

The mobile service chaining network illustrated in FIG. 1 further comprises an Internet Protocol (IP) Advertisement Point (IAP) 19 enabling the facilitating of an anchorless network; i.e. a network without a mobility anchor point. An LAP advertises a range of IP addresses/prefixes towards an IP network 22 to which a number of peer devices 21 may be connected. This may be Internet or an operator-internal network. A single IP address/prefix may be advertised by multiple IAPs. If the IP address of a specific device is advertised by multiple IAPs, then packets for that device can enter the network via any of those IAPs (the device may thus be connected to multiple IAPs). Similarly, an anchored approach can be achieved by allowing only a single IAP to advertise the IP address for that device.

The control plane contains a Location Registry (LR). This is a table of entries, where each entry is a mapping from device IP address/prefix to current device location and optionally device identifier (ID) in case the IP address is not considered sufficient to identify the mobile terminal. The current device location may be encoded as a BS ID, i.e. an identifier designating the BS on which the mobile terminal currently camps.

When a device moves from one BS to another, the CP node 20 ensures that the BS ID in the LR is updated with the new location. An IAP is only used for downlink packets. For each downlink packet, the IAP does: 1) query the LR based on the destination IP address of the packet in order to retrieve current location (e.g. BS ID) and optionally device ID; 2) tag the packet with a location identifier and optionally the device ID; 3) forward the packet to the appropriate destination. Note that the LR can be implemented in a distributed fashion. For instance, the IAP query may be performed towards an IAP-internal cache. Only if no entry is found in that cache, the CP node 20 is queried. For non-mobile devices, implementing the query is simplified as the entry in the LR for that device will not change.

If implemented in an EPC network, the part of the mobile service chaining network shown in FIG. 1 comprising the UPFs, the FEs and the IAP would typically be interfaced to an SGi reference point, between an IP network and a Packet Data Network Gateway (PGW). It may further be envisaged that functionality of the current PGW and Serving Gateway (SGW) can be moved to the mobile service chaining network connected to the SGi.

In practice, the steps of the method performed by the CP node 20 according to embodiments of the invention, is caused by a processing unit 30 embodied in the form of one or more microprocessors arranged to execute a computer program 32 downloaded to a suitable storage medium 31 associated with the microprocessor, such as a Random Access Memory (RAM), a Flash memory or a hard disk drive. The processing unit 30 is arranged to cause the CP node 20 to carry out at least one step of the method according to embodiments of the present invention when the appropriate computer program 32 comprising computer-executable instructions is downloaded to the storage medium 31 and executed by the processing unit 30. The storage medium 31 may also be a computer program product comprising the computer program 32. Alternatively, the computer program 32 may be transferred to the storage medium 31 by means of a suitable computer program product, such as a Digital Versatile Disc (DVD) or a memory stick. As a further alternative, the computer program 32 may be downloaded to the storage medium 31 over a network. The processing unit 30 may alternatively be embodied in the form of a digital signal processor (DSP), an application specific integrated circuit (ASIC), a field-programmable gate array (FPGA), a complex programmable logic device (CPLD), etc. The IAP 19 will correspondingly comprise a processing unit arranged to execute a computer program downloaded to a suitable storage medium associated with the processing unit, for performing the steps of the method performed by the IAP 19 according to embodiments of the invention.

Figure 2:
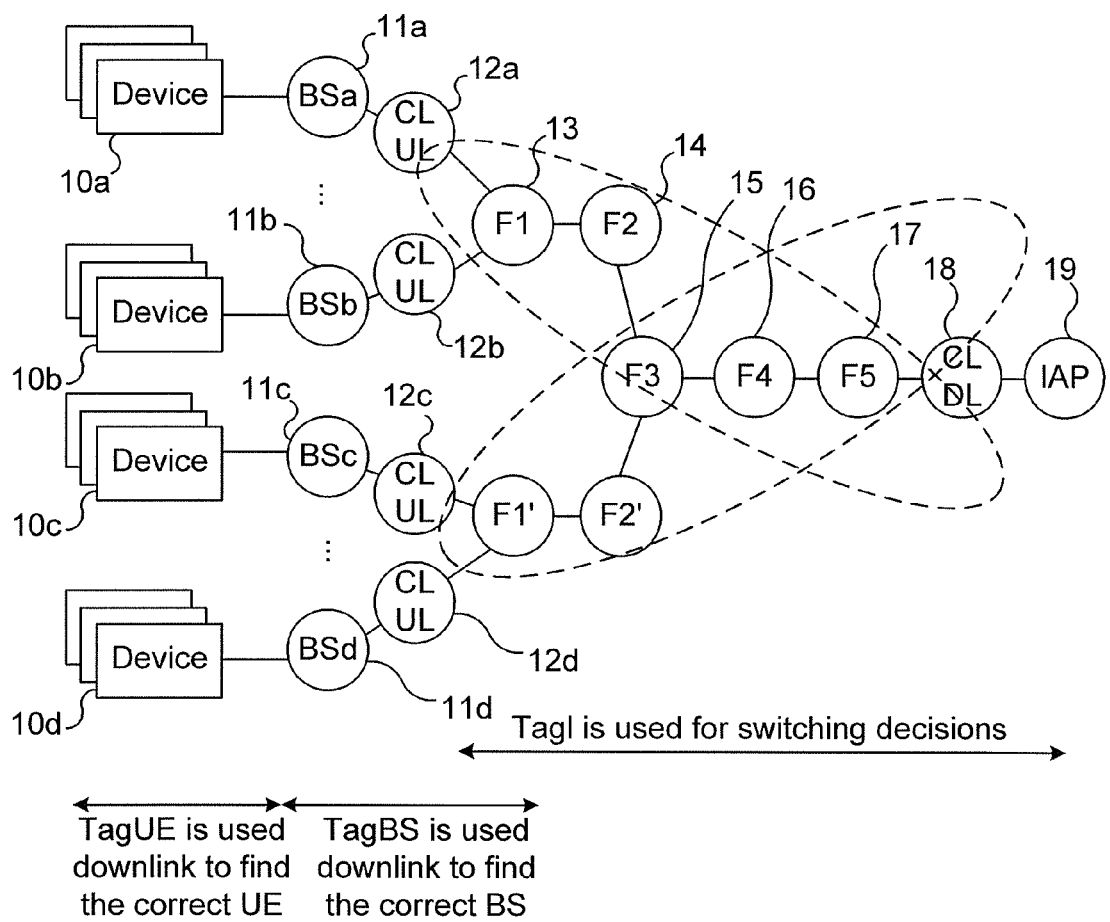
FIG. 2 illustrates a mobile service chaining network in which the invention advantageously may be implemented.

FIG. 2 illustrates a mobile service chaining network in which the invention advantageously may be implemented. This exemplifying mobile service chaining network, illustrating a mobile broadband use case, comprises a group of devices 10a-d, typically being mobile terminals, and referred to in the following as User Equipment (UE), base stations (BSs) 11a-d, and UPFs referred to as F1-F5 (and F1', F2') denoted 13-16 (and 13' 14'), respectively.

The mobile service chaining network illustrated in FIG. 2 further comprises an IAP 19 enabling the facilitating of an anchorless network; i.e. a network without a mobility anchor point, as was described with reference to FIG. 1.

Packets are forwarded to different UPFs and BSs according to which service chain the packets need to traverse and where the corresponding devices are located. Such information is added to the packet as tags by a downlink (DL) 18 and an uplink classifier (CL) 12a-d for each BS. A classifier CL is a UPF that determines which service chain a packet takes based on the packet header and rules it has received from the CP node (not shown in FIG. 2). A CL may change the packet's header, e.g. adding a tag to indicate which service chain the packet traverses. A CL may contact the CP node when a packet cannot be classified, or it may drop such packet. The classifier can be configured by the CP node with rules at several occasions, such as before, during or after a UE attaches.

The exemplifying mobile broadband service chain network of FIG. 2 uses four BSs 11a-11d; BSa through BSd. Each BS serves a plurality of UEs. F5 is a firewall UPF. This function may be placed high up in the chain; e.g. in a national data center. F4 and F3 are UPFs for charging and parental control, respectively. These may be placed in the same data center as the firewall. F1 and F2 are UPFs placed closer to the BS; e.g. in an aggregation site. These could e.g. perform access network protocol handling or bandwidth limiting. F1 only serves a subset of the BSs. Another instance of the same UPF, i.e. F1', serves the other subset. F1 and F1' are placed in different sites, and so are F2 and F2'. The uplink classifier CL(UL) is placed between BS and F1, and the downlink classifier CL(DL) between IAP and F5. Note that the downlink classifier CL(DL) determines both the service chain type, i.e. mobile broadband in this example, and the service chain instance, i.e. in this example if traffic should traverse F5-F4-F3-F2-F1 or F5-F4-F3-F2'-F1'.

In this use case, three tags are used for most of the traffic. The chain of functions F1-F2-F4-F5 is used by all packets. These get tagged by the uplink and downlink classifiers CL(UL) and CL(DL) with "TagI", where I stands for Internet traffic. In the downlink, the IAP adds "TagBS" which identifies the location of the BS the UE is currently connected to. The third tag, "TagUE", is also added by the IAP and identifies the UE itself. As shown in FIG. 2, TagI is used to make forwarding decisions between F1 and F5. TagBS is used only in the downlink by the FE (not shown) of F1 to find the correct BS, while TagUE is used by the BS to find the correct UE. A fourth tag, "TagP", is set in case this user has subscribed to the parental control service. The UPF of F3 is only involved by the FE of F3 if TagP is set.

Hence, by using different tags, in this case TagI=x and TagI=y, data packets can advantageously traverse different routes in the network.

Figure 3:
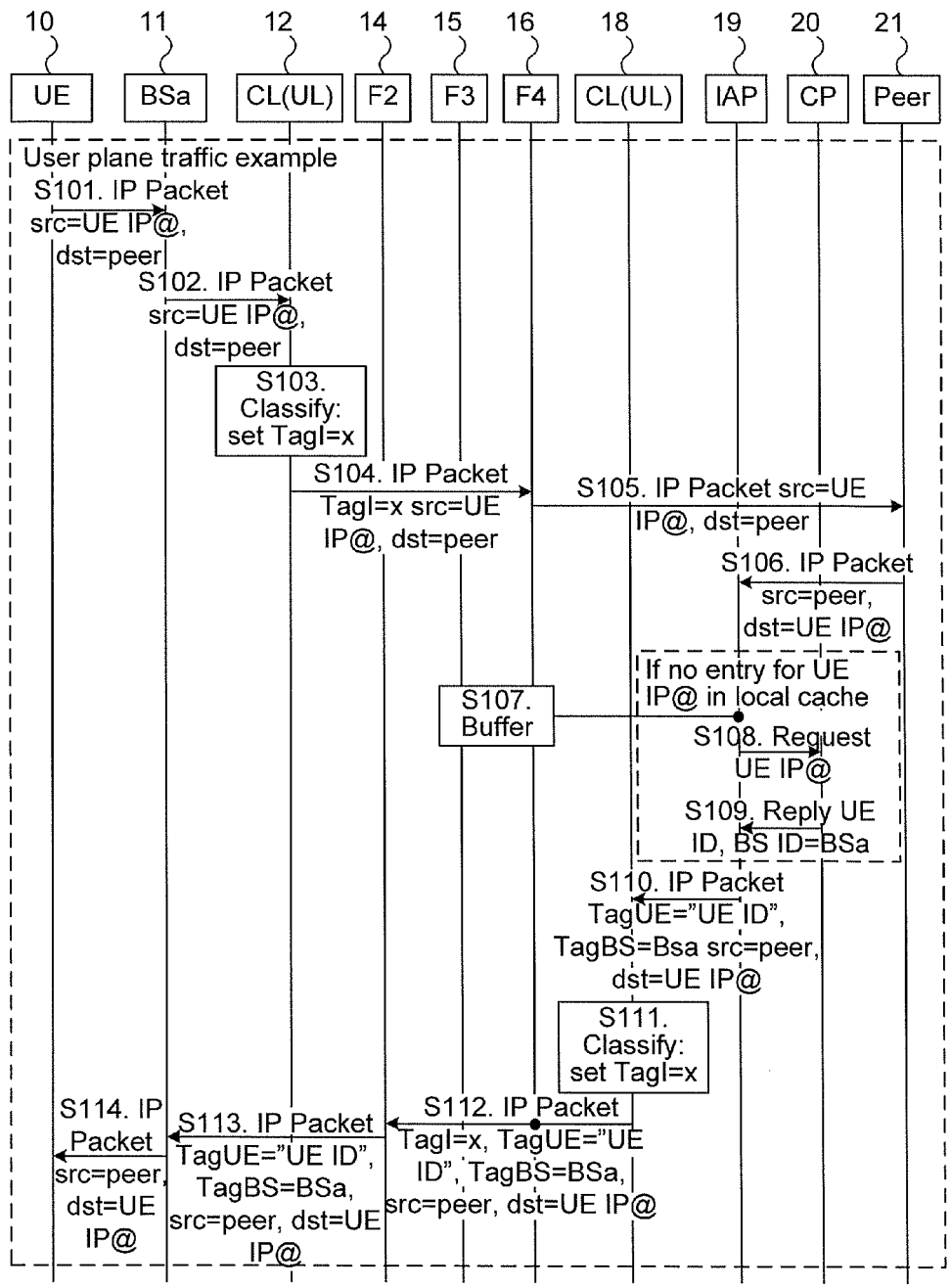
FIG. 3 illustrates a user plane traffic example in the form of an Internet packet exchange between a mobile terminal and a peer device.

FIG. 3 illustrates a user plane traffic example in the form of an Internet packet exchange between a UE 10 and a peer device 21, being for instance a laptop, via a mobile service chaining network. In a first step S101, the UE 10 sends an IP packet to the BS 11 indicating a packet source in the form of the IP address of the UE 10, as well as a packet destination designating the peer device 21. The BS 11 forwards in step S102 the IP packet to the uplink classifier CL(UL) 12, which tags the packet with TagI=x indicating internet transfer using route x. In this particular example, the route undertaken via steps S104 and S105 is F2-F4-peer device 21.

In step S106, the peer device 21 sends an IP packet to the LAP 19 indicating a packet source (peer), as well as a packet destination designating the UE in in the form of the IP address of the UE 10.

When the IAP 19 receives the downlink packet from the peer device 21, it needs to find the current location of the UE 10 in the LR. As previously mentioned, the LR is logically a single entity but may be implemented in a distributed way. Each IAP may have a cache with a local LR. If no entry for the IP address of the UE 10 is found in the local cache of the LAP 19, the IAP may perform a query to the global LR. The query to the global LR may take time, and during that time additional downlink packets heading towards the same UE IP address may be sent to the IAP 19. The IAP 19 hence needs to implement a buffering mechanism and starts buffering incoming packet in step S107. It is assumed that the global LR is contained within the CP, so the LAP 19 sends in step S108 a request to the CP node 20, which replies in step S109 with UE ID and the ID of the particular base station, i.e. BS ID=BSa for this particular IP address.

The IAP 19 thus tags the packet with UE ID and BSa ID and sends it in step S110 to the downlink classifier CL(DL) 18, which tags the packet in step S111 with TagI=x indicating internet transfer using route x. In this particular example, the route undertaken via steps S112 and S113 is F4-F2-BSa 11. Finally, BSa 11 delivers the packet to the UE 10.

As has been mentioned, in the mobile service chaining networks in the art, the mobile terminals can be regarded as always being in connected mode.

Figure 4:
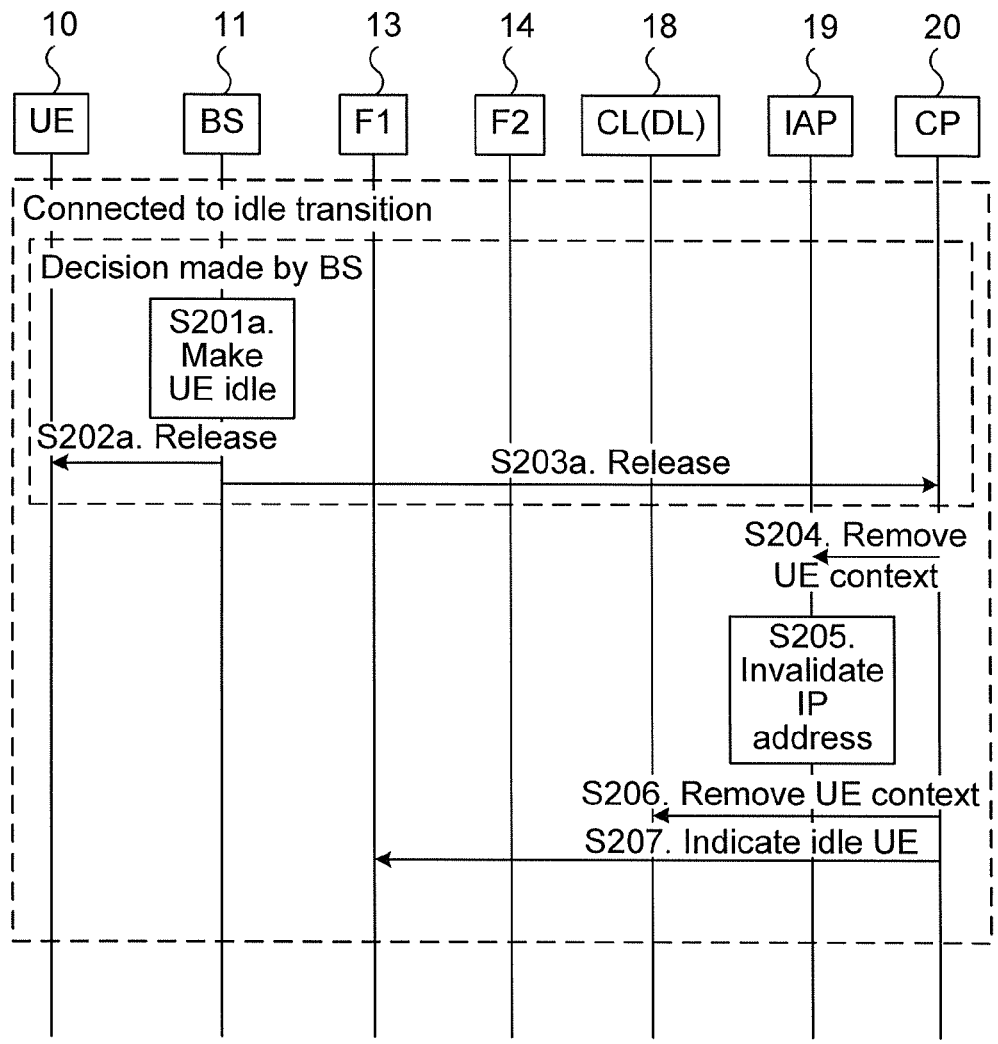
FIG. 4 illustrates a mobile service chaining network in which an embodiment of the invention advantageously is implemented for performing connected-to-idle-transition.

FIG. 4 illustrates a mobile service chaining network in which an embodiment of the invention advantageously is implemented. The scenario described is a connected-to-idle transition. In this exemplifying mobile service chaining network, a UE 10 connects to CP node 20 via BS 11. In case of LTE, the BS 11 is an eNodeB, and the CP node 20 is an MME.

The mobile service chaining network illustrated in FIG. 4 comprises two UPFs referred to as F1 and F2 denoted 13, 14, respectively. F1 and F2 may e.g. perform functions such as access network protocol handling or bandwidth limiting. As previously described, the mobile service chaining network further comprises a downlink classifier CL(DL) 18 and an IAP 19.

In FIG. 4, the decision to transit the UE 10 from connected to idle mode is initiated by the BS 11 in step S201a, which sends a Radio Resource control (RRC) release message to the UE 10 in step S202a. Thereafter, in step S203a, the BS 11 submits a further release message to the CP node 20. This procedure is used to initiate subsequent release of the control plane signalling connection over S1-MME and all user plane bearers over S1-U for the UE 10, and all UE related context information is deleted in the BS 11, thus making step S202a optional. It should be noted that steps S202a and S203a could be performed in the reverse order, or simultaneously.

According to an embodiment of the invention, after the BS 11 has set the UE 10 in idle mode and informed the CP node 20 accordingly in step S203a, the CP node 20 (e.g. the MME) sends a remove UE context message to the IAP 19 in step S204. In response thereto, the IAP 19 invalidates or removes its cache entry for the particular IP address of this UE 10 in step S205. That is, the location identifier (e.g. in the form of BS ID) of the cache entry associated with this particular IP address is invalidated or removed, and as a result the UE 10 is advantageously set in idle mode. Optionally, a UE ID may be included in the cache entry, which also is invalidated or removed.

Thus, the local cache may contain the following:

| Cache entry | UE context | | |
| --- | --- | --- | --- |
| #1 | IP Address 1 | BS ID 1 | (UE ID 1) |
| #2 | IP Address 2 | BS ID 1 | (UE ID 2) |
| #3 | IP Address 3 | BS ID 2 | (UE ID 3) |

The UE context comprises IP address of a mobile terminal, a location identifier of the mobile terminal in the form of a BS ID, and optionally a UE ID of the mobile terminal. If it is determined that a cache entry for IP Address 2 is to invalidated, the IAP 19 typically clears the complete entry, in this example entry #2.

Optionally, the CP node 20 may in order to save network resources also inform other network elements to remove context for the UE 10 that is set in idle mode. For instance, the downlink classifier CL(DL) 18 may hold UE-specific classification rules, which advantageously can be removed. Further, one or more UPFs may also advantageously release UE context or at least receive a notification that the UE 10 is transitioning to idle mode. In FIG. 4, the classification state (i.e. the UE-related context) of the CL(DL) 18 is removed in step S206, while F1 only is notified that the UE has moved to idle state in step S207 and F2 is not informed at all.

Figure 5:
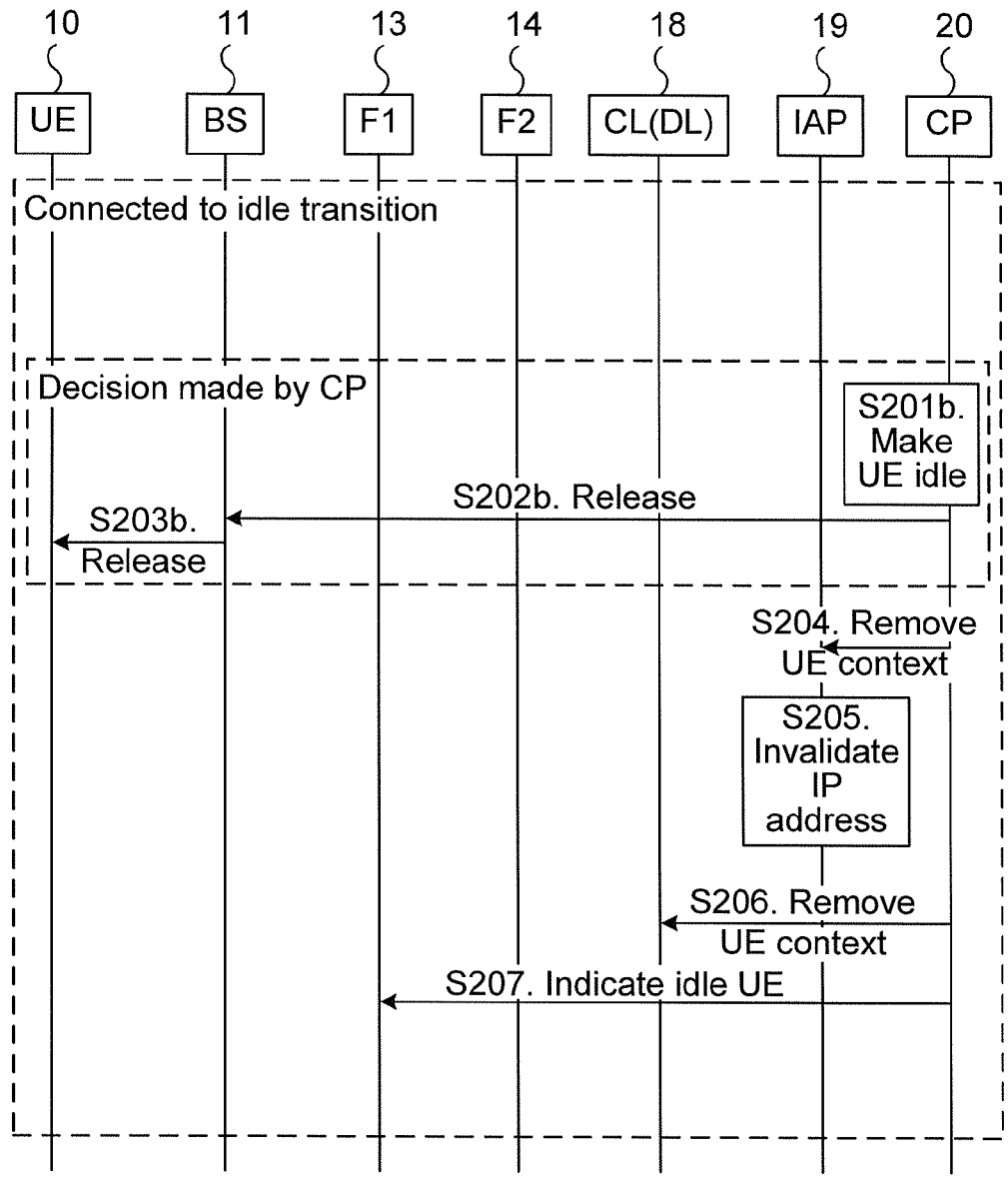
FIG. 5 illustrates a mobile service chaining network in which an alternative embodiment of the invention advantageously is implemented for performing connected-to-idle-transition.

FIG. 5 illustrates an alternative embodiment of the invention, where the decision to have the UE 10 transit from connected to idle mode is initiated by the CP node 20 in step S201*b*, which sends an RRC release message to the BS 11 in step S202*b*, which in its turn in step S203*b* optionally submits the release message to the UE 10 (cf. step S202*a* in FIG. 4). The CP node 20 thus initiates the UE 10 to be set in idle mode by sending the RRC release message in step S202*b* to the BS 11.

As in the embodiment described with reference to FIG. 4, in step S204, the CP node 20 (e.g. the MME) sends a remove UE context message to the IAP 19. In response thereto, the IAP 19 invalidates or removes its cache entry for the particular IP address of this UE 10 in step S205. That is, the UE ID and the BS ID of the cache entry associated with this particular IP address is invalidated/removed along with the IP address itself.

Optionally, the CP node 20 may in order to save network resources also inform other network elements to remove context for the UE 10 that is set in idle mode. For instance, the downlink classifier CL(DL) 18 may hold UE-specific classification rules, which advantageously can be removed. Further, one or more UPFs may also advantageously release UE context or at least receive a notification that the UE 10 is transitioning to idle mode. In FIG. 4, the classification state (i.e. the UE-related context) of the CL(DL) 18 is removed in step S206, while F1 only is notified that the UE has moved to idle state in step S207 and F2 is not informed at all.

Regarding UE context in idle mode, user plane network elements (such as UPFs, CLs, FEs and BS) can be differentiated into four types.

1. The element does not hold any UE context and therefore does not need to be notified when the UE is transitioning between idle and connected states.

2. The element holds contexts for UEs and wishes to keep this context irrespective of idle or connected state and thus does not need to be notified.

3. The element holds UE contexts and needs to know when the UE is idle (e.g., to perform a certain action). In this case the CP node submits a signal accordingly at state transitions, but the UE context shall be kept in the element.

4. The element holds UE context, but only when the UE is connected. In this case, the CP node needs to remove/re-establish UE context in this element at state transitions.

In FIGS. 4 and 5, explicit signalling between control plane and user plane network elements is utilized to inform the latter of a transition to idle mode. Alternatively, the removing of UE context in user plane network elements like IAPs, CLs, UPFs and BS may in an embodiment advantageously be based on timers. For instance; after a number of seconds of inactivity, the context for a UE is removed. Setting such timers would need to be coordinated from the CP node 20, e.g. to ensure that the IAP 19 always times out before the CL(DL) 18, etc. Thus, with respect to e.g. the IAP 19, instead of receiving an instruction from the CP node 20 in step S204 to invalidate the UE context, a timer expiring at the IAP 19 will have the IAP 19 invalidating the UE context.

Figure 6:
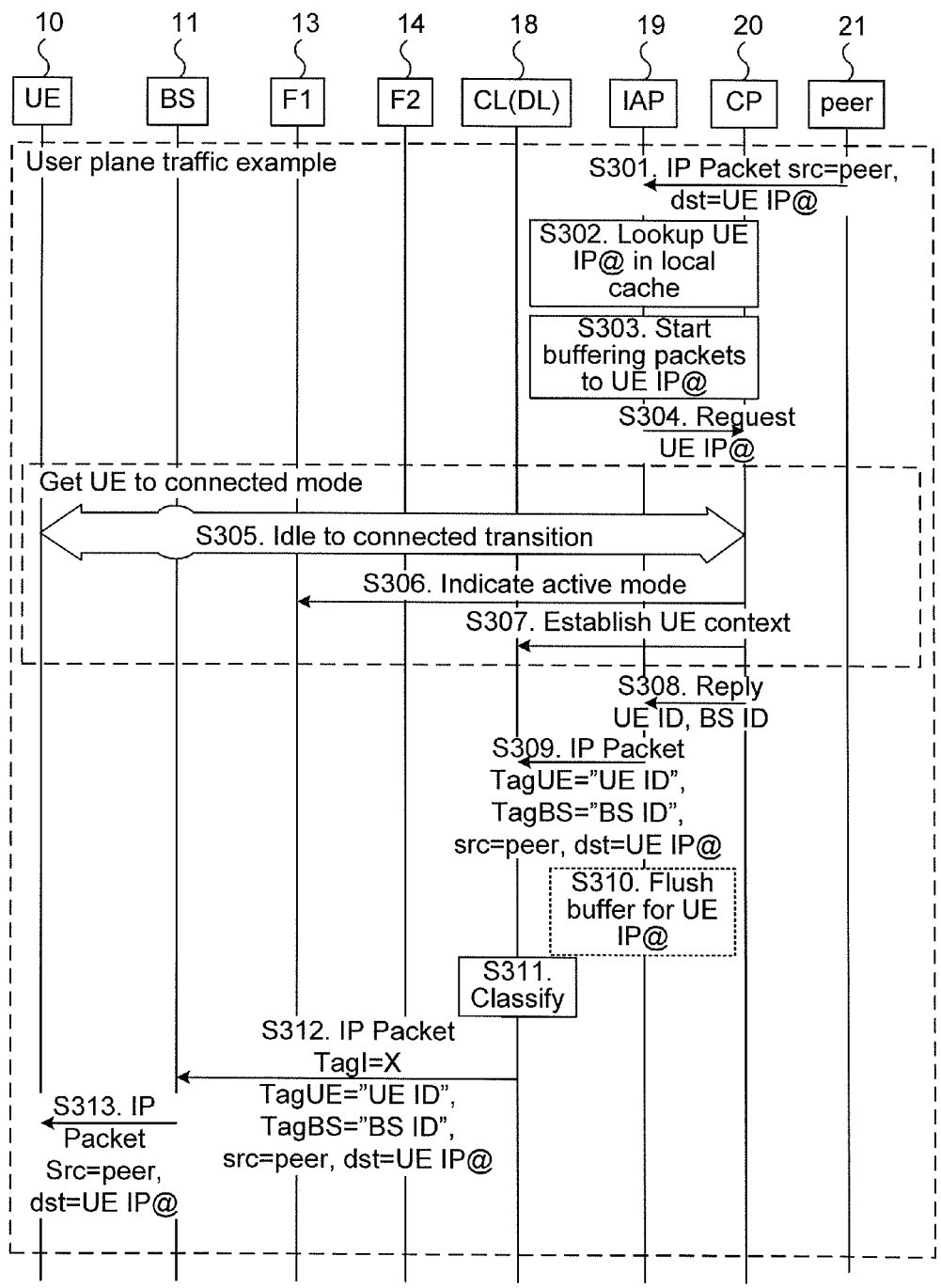
FIG. 6 illustrates a mobile service chaining network in which an embodiment of the invention advantageously is implemented for performing idle-to-connected-transition.

FIG. 6 illustrates the mobile service chaining network of FIG. 4 in which an embodiment of the invention advantageously is implemented, but where an idle-to-connected-transition of the UE 10 is effected. The peer device 21, being for instance a laptop, sends in a first step S301 an IP packet to the IAP 19 over the Internet. In the packet, indicating a packet destination in the form of the IP address of the UE 10, as well as a packet source designating the peer device 21.

When the IAP 19 receives the downlink packet from the peer device 21, it needs to find the current location of the UE 10 in the LR. As previously mentioned, the LR is logically a single entity but may be implemented in a distributed way. Each IAP may have a cache with a local LR in which it performs a look-up in step S302. If no entry for the IP address of the UE 10 is found in the local cache of the IAP 19, the IAP starts buffering the incoming packets in step S303 and performs a query to the global LR. It is assumed that the global LR is contained within the CP, so the IAP 19 sends in step S304 a request to the CP node 20, which in this embodiment of the invention triggers the CP node 20 to submit a message to the UE 10 in step S305 via the BS 11 to transit to connected mode (this may include a round of messages being exchanged between the UE 10/BS 11 and the CP node 20).

The CP node 20 may also inform other network elements of the transition. Fir instance, in FIG. 6, the UPF denoted F1 is notified in step S306 that the UE 10 is now connected, while the downlink classifier CL(DL) 18 is provided with classification rules for the UE in step S307 (i.e. the context for the UE 10 is re-established at the CL(DL) 18).

The CP node 20 replies in step S308 to the request of the IAP 19 in step S304 with UE ID and BS ID for this particular IP address. The IAP 19 thus tags the buffered packets with UE ID and BS ID, sends the packets in step S309 to the downlink classifier CL(DL) 18, and flushes its buffer for this particular IP address in step S310.

The CL(DL) 18 tags the packet in step S311 with TagI=x indicating Internet transfer using route x. In this particular example, the route undertaken via step S312 is F2-F1-BS. Finally, BS 11 delivers the packet to the UE 10 in step S313.

Figure 7A:
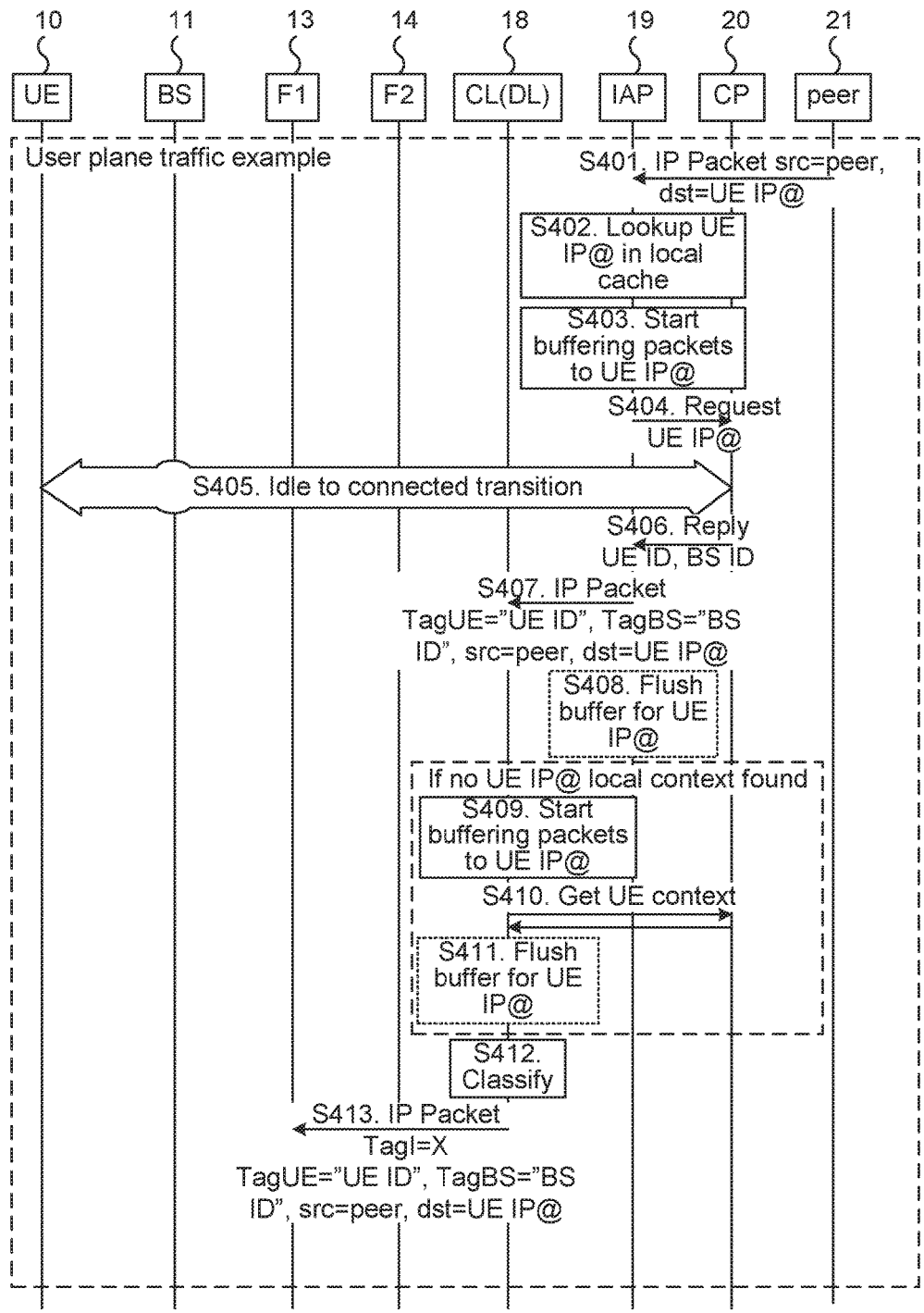
FIGS. 7A and 7B illustrate a mobile service chaining network in which an alternative embodiment of the invention advantageously is implemented for performing idle-to-connected-transition.
Figure 7B:
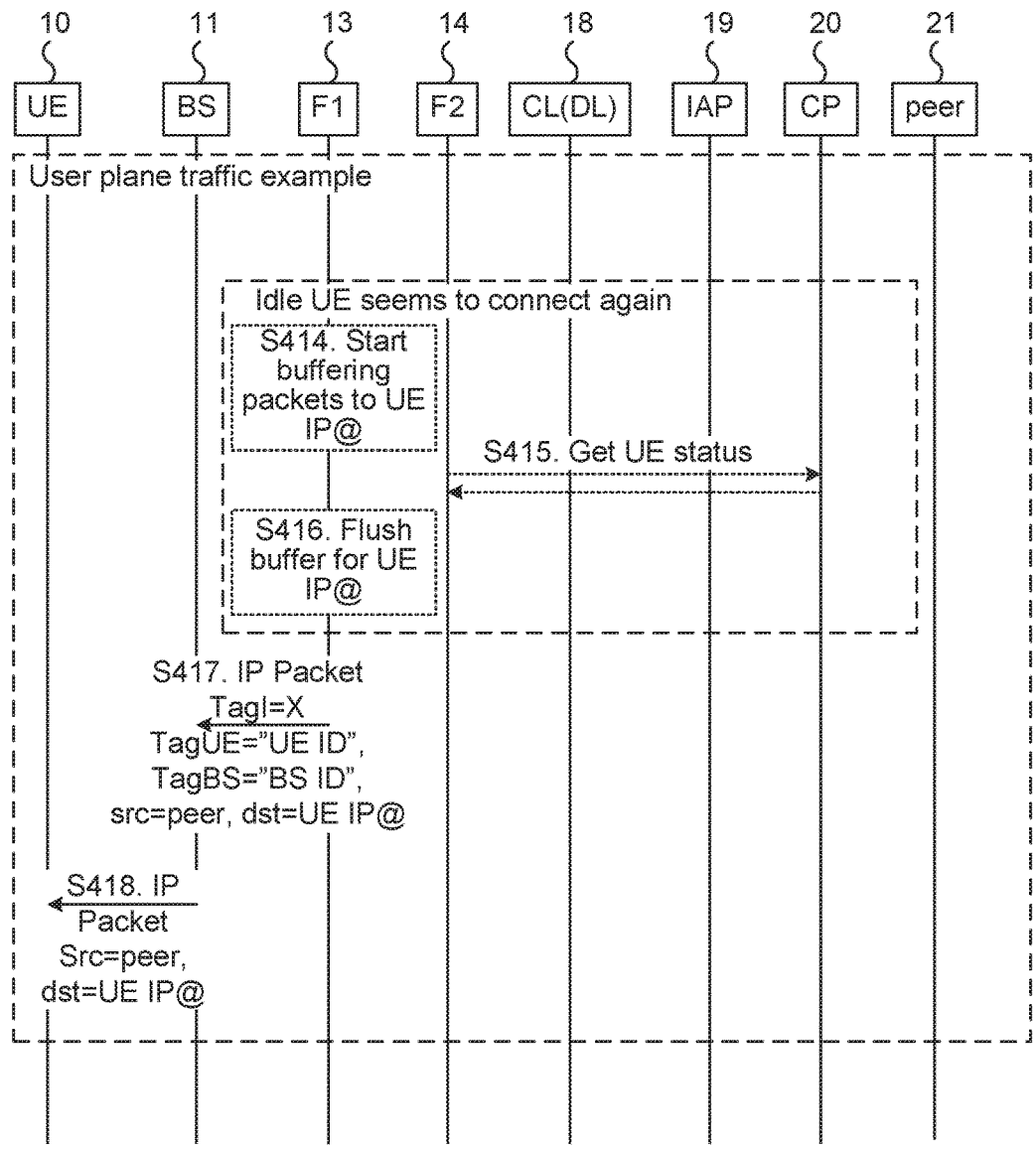

FIGS. 7A and 7B illustrate the mobile service chaining network of FIG. 6 in which the invention advantageously is implemented, but where during an idle-to-connected-transition some mobile service chaining network elements themselves fetch UE context or mobile station status from the CP node 20.

The peer device 21 sends, in a first step S401, an IP packet to the IAP 19. In the packet, a packet destination is indicated in the form of the IP address of the UE 10, as well as a packet source designating the peer device 21.

When the IAP 19 receives the downlink packet from the peer device 21, it needs to find the current location of the UE 10 in the LR, and performs look-up in a local LR in step S402. If no entry for the IP address of the UE 10 is found in the local cache of the IAP 19, the IAP starts buffering the incoming packets in step S403 and performs a query to the global LR. It is assumed that the global LR is contained within the CP, so the IAP 19 sends in step S404 a request to the CP node 20, which in this embodiment of the invention triggers the CP node 20 to submit a message to the UE 10 in step S405 via the BS 11 to to transit to connected mode (this may include a round of messages being exchanged between the UE 10/BS 11 and the CP node 20).

The CP node 20 replies in step S406 to the request of the IAP 19 in step S404 with UE ID and BS ID for this particular IP address. The IAP 19 thus tags the buffered packets with UE ID and BS ID, sends the packets in step S407 to the downlink classifier CL(DL) 18, and flushes its buffer for this particular IP address in step S408.

If no context if found locally at the CL(DL) 18, the CL(DL) 18 needs to start buffering packet intended for the IP address in step S409, whereby the CL(DL) 18 requests and receives the UE context in step S410 from the CP node 20. In step S411, the buffer is flushed and the CL(DL) 18 tags the packets in step S412 with TagI=x indicating Internet transfer using route x. In this particular example, the route undertaken via step S413 (and subsequently S417) is F2-F1-BS.

If F1 is not aware that the UE is in connected mode, it may start buffering the packets in step S414 and query the CP node 20 about the UE status in step S415. If F1 receives a reply that the UE 10 indeed is connected it flushes the buffer in step S416 and sends the packet to BS 11 as indicated in the tag in step S417. Finally, BS 11 delivers the packet to the UE 10 in step S418.

Figure 8:
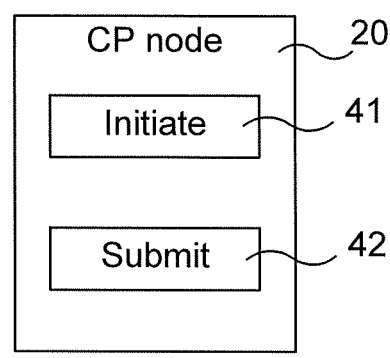
FIG. 8 illustrates a control plane node according to an embodiment of the invention.

FIG. 8 shows a CP node 20 configured to control a communication mode of a mobile terminal in a mobile service chaining network according to an embodiment of the invention. The CP node 20 comprises initiating means 41 adapted to initiate setting of the mobile terminal in idle mode; and submitting means 42 adapted to submit an instruction to at least one LAP serving the mobile terminal to invalidate context for the mobile terminal held by the at least one IAP, wherein the at least one IAP invalidates at least a registered IP address used for the mobile terminal. The initiating means 41 and the submitting means 42 may comprise a communications interface for receiving and providing information, and further a local storage for storing data. The initiating means 41 and the submitting means 42 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive.

Figure 9:
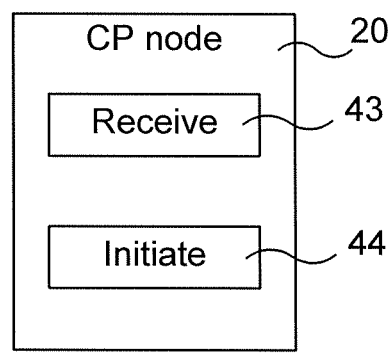
FIG. 9 illustrates a control plane node according to another embodiment of the invention.

FIG. 9 shows a CP node 20 configured to control a communication mode of a mobile terminal in a mobile service chaining network according to another embodiment of the invention. The CP node 20 comprises receiving means 43 adapted to receive a query from at least one IAP serving the mobile terminal to obtain an indication of a current location of the mobile terminal from an LR based on an IP address of the mobile terminal included in the query, and initiating means 44 adapted to initiate setting of the mobile terminal in connected mode in response to the query. The receiving means 43 and the initiating means 44 may comprise a communications interface for receiving and providing information, and further a local storage for storing data. The receiving means 43 and the initiating means 44 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a control plane node controlling a communication mode of a mobile terminal in a mobile service chaining network, comprising:
   the control plane node initiating setting of the mobile terminal in idle mode;
   the control plane node submitting an instruction to an Internet Protocol Advertisement Point (IAP) serving the mobile terminal, wherein the instruction is configured to cause the IAP to invalidate a context for the mobile terminal held by the IAP, wherein the IAP is configured to advertise towards an IP network one or more of: (i) a range of IP addresses and (ii) a range of IP prefixes, and the IAP is further configured such that when the IAP receives a packet addressed to the network address of the mobile terminal and the IAP is able to determine a location identifier associated with the network address of the mobile terminal, the IAP forwards the packet and the determined location identifier to a first user plane function; and
   the control plane node submitting an instruction to the first user plane function, wherein the instruction is configured to cause the first user plane function to invalidate a context for the mobile terminal.

2. The method of claim 1, further comprising:
   submitting an instruction to at least one other network element in the mobile service chaining network to invalidate context for the mobile terminal.

3. The method of claim 1, further comprising:
   submitting a notification to at least one other network element in the mobile service chaining network indicating that the mobile terminal is set in idle mode.

4. The method of claim 1, the initiating further comprising:
   receiving, from a base station, a message that the mobile terminal is set in idle mode by the base station.

5. A method performed by a control plane network node of controlling a communication mode of a mobile terminal in a mobile service chaining network, comprising:
   the control plane network node receiving a query transmitted by an Internet Protocol Advertisement Point (IAP) serving the mobile terminal to obtain a base station identifier providing an indication of a current location of the mobile terminal based on an Internet Protocol (IP) address of the mobile terminal included in the query, wherein the IAP is configured to advertise towards an IP network one or more of: (i) a range of IP addresses and (ii) a range of IP prefixes, and the IAP is further configured to transmit the query to the control plane network node as a result of the IAP receiving a packet addressed to the IP address of the mobile terminal and the IAP determining that the IAP does not have valid information linking the IP address of the mobile terminal with a base station identifier;
   in response to the query from the IAP, the control plane network node transmitting to the IAP a base station identifier, wherein the IAP is configured such that as a result of receiving the response to the query, the IAP stores information linking the IP address of the mobile terminal with the base station identifier included in the response to the query; and the control plane network node initiating setting of the mobile terminal in connected mode in response to said query.

6. The method of claim 5, further comprising:
submitting a notification to at least one other network element in the mobile service chaining network indicating that the mobile terminal is set in connected mode.

7. The method of claim 5, further comprising:
receiving from at least one other network element in the mobile service chaining network a query as to whether the mobile terminal is set in connected mode.

8. The method of claim 5, further comprising:
submitting an instruction to at least one other network element in the mobile service chaining network to re-establish context for the mobile terminal.

9. The method of claim 5, further comprising:
receiving from at least one other network element in the mobile service chaining network a query to receive context for the mobile terminal.

10. A method performed by an Internet Protocol Advertisement Point (IAP) of managing context of a mobile terminal in a mobile service chaining network, comprising:
the IAP advertising towards an IP network one or more of: (i) a range of Internet Protocol (IP) addresses and (ii) a range of IP prefixes;
the IAP receiving a downlink packet, wherein the downlink packet includes an IP address of the mobile terminal;
as a result of receiving the downlink packet, the IAP obtaining a base station identifier (BS-ID) that is linked with the IP address of the mobile terminal, wherein obtaining the BS-ID comprises transmitting to a control plane network node a query comprising the IP address, wherein the query is configured to cause the control plane network node to retrieve a BS-ID linked with the IP address and transmit to the IAP a query response comprising the retrieved BS-ID;
the IAP receiving the query response;
as a result of receiving the query response, the IAP storing information linking the IP address with the obtained BS-ID;
the IAP receiving an indication that context of the mobile terminal should be invalidated upon the mobile terminal being set in idle mode; and
in response to the received indication, the IAP invalidating the stored information linking the IP address with the obtained BS-ID.

11. The method of claim 10, the receiving of an indication further comprising:
receiving an instruction from a control plane network node to invalidate context of the mobile terminal.

12. The method of claim 10, the receiving of an indication further comprising:
acquiring information regarding expiry of a timer specifying a time period since the mobile terminal was last active, the expiry of the timer indicating that context should be invalidated, wherein at least the registered IP address used for the mobile terminal is invalidated.

13. The method of claim 10, wherein the invalidating of the registered IP address further comprises:
removing the registered IP address from a local storage of the IAP.

14. The method of claim 10, the method further comprising:
tagging the downlink packet with a location identifier, wherein the location identifier indicates the current location of the mobile terminal; and
forwarding the downlink packet.

15. The method of claim 10, wherein the IAP comprises a cache, said cache containing a Location Registry (LR).

16. A control plane node configured to control a communication mode of a mobile terminal in a mobile service chaining network, which comprises a processing unit and a memory, said memory containing instructions executable by said processing unit, whereby said control plane node is operative to:
initiate setting of the mobile terminal in idle mode;
submit an instruction to an Internet Protocol Advertisement Point (IAP) serving the mobile terminal, wherein the instruction is configured to cause the IAP to invalidate a context for the mobile terminal held by the IAP, the IAP is configured to advertise towards an IP network one or more of: (i) a range of IP addresses and (ii) a range of IP prefixes, and the IAP is further configured such that when the IAP receives a packet addressed to the network address of the mobile terminal and the IAP is able to determine a location identifier associated with the network address of the mobile terminal, the IAP forwards the packet and the determined location identifier to a first user plane function; and
submitting an instruction to the first user plane function, wherein the instruction is configured to cause the first user plane function to invalidate a context for the mobile terminal.

17. The control plane node of claim 16, further being operative to:
submit an instruction to at least one other network element in the mobile service chaining network to invalidate context for the mobile terminal.

18. The control plane node of claim 16, further being operative to:
submit a notification to at least one other network element in the mobile service chaining network indicating that the mobile terminal is set in idle mode.

19. The control plane node of claim 16, further being operative to:
receive, from a base station, a message that the mobile terminal is set in idle mode by the base station.

20. A control plane system comprising at least two control plane nodes configured to control a communication mode of a mobile terminal in a mobile service chaining network, each control plane node comprising a processing unit and a memory, said memory containing instructions executable by said processing unit, whereby said control plane system is operative to:
initiate setting of the mobile terminal in idle mode;
submit an instruction to an Internet Protocol Advertisement Point (IAP) serving the mobile terminal, wherein the instruction is configured to cause the IAP to invalidate a context for the mobile terminal held by the IAP, the IAP is configured to advertise towards an IP network one or more of: (i) a range of IP addresses and (ii) a range of IP prefixes, and the IAP is further configured such that when the IAP receives a packet addressed to the network address of the mobile terminal and the IAP is able to determine a location identifier associated with the network address of the mobile terminal, the IAP forwards the packet and the determined location identifier to a first user plane function; and submitting an instruction to the first user plane function, wherein the instruction is configured to cause the first user plane function to invalidate a context for the mobile terminal.

21. A control plane node configured to control a communication mode of a mobile terminal in a mobile service chaining network, which comprises a processing unit and a memory, said memory containing instructions executable by said processing unit, whereby said control plane node is operative to:
receive a query transmitted by an Internet Protocol Advertisement Point (IAP) serving the mobile terminal to obtain a base station identifier providing an indication of a current location of the mobile terminal based on an Internet Protocol (IP) address of the mobile terminal included in the query, wherein the IAP is configured to advertise towards an IP network one or more of: (i) a range of IP addresses and (ii) a range of IP prefixes, and the IAP is further configured to transmit the query to the control plane network node as a result of the IAP receiving a packet addressed to the IP address of the mobile terminal and the IAP determining that the IAP does not have valid information linking the IP address of the mobile terminal with a base station identifier;
in response to the query from the IAP, transmit to the IAP a base station identifier, wherein the IAP is configured such that as a result of receiving the response to the query, the IAP stores information linking the IP address of the mobile terminal with the base station identifier included in the response to the query; and
initiate setting of the mobile terminal in connected mode in response to said query.

22. The control plane node of claim 21, further being operative to:
submit a notification to at least one other network element in the mobile service chaining network indicating that the mobile terminal is set in connected mode.

23. The control plane node of claim 21, further being operative to:
receive from at least one other network element in the mobile service chaining network a query as to whether the mobile terminal is set in connected mode.

24. The control plane node of claim 21, further being operative to:
submit an instruction to at least one other network element in the mobile service chaining network to re-establish context for the mobile terminal.

25. The control plane node of claim 21, further being operative to:
receive from at least one other network element in the mobile service chaining network a query to receive context for the mobile terminal.

26. The control plane node of claim 21, further being operative to:
submit, in response to the query from the IAP, the indication of the current location of the mobile terminal obtained from a Location Registry (LR).

27. An Internet Protocol Advertisement Point (IAP) configured to manage context of a mobile terminal in a mobile service chaining network, which comprises a processing unit and a memory, said memory containing instructions executable by said processing unit, whereby said IAP is operative to:
advertise towards an IP network one or more of: (i) a range of Internet Protocol (IP) addresses and (ii) a range of IP prefixes;
receive a downlink packet, wherein the downlink packet includes an IP address of the mobile terminal;
as a result of receiving the downlink packet, obtain a base station identifier (BS-ID) that is linked with the IP address of the mobile terminal, wherein obtaining the BS-ID comprises transmitting to a control plane network node a query comprising the IP address, wherein the query is configured to cause the control plane network node to retrieve a BS-ID linked with the IP address and transmit to the IAP a query response comprising the retrieved BS-ID;
receive the query response;
as a result of receiving the query response, store information linking the IP address with the obtained BS-ID;
receive an indication that context of the mobile terminal should be invalidated upon the mobile terminal being set in idle mode; and
in response to the received indication, invalidate the stored information linking the IP address with the obtained BS-ID.

28. The IAP of claim 27, further being operative to:
receive an instruction from a control plane network node to invalidate context of the mobile terminal.

29. The IAP of claim 27, further being operative to:
acquire information regarding expiry of a timer specifying a time period since the mobile terminal was last active, the expiry of the timer indicating that context of the mobile terminal should be invalidated, wherein at least the registered IP address used for the mobile terminal is invalidated.

30. The IAP of claim 27, further being operative to:
remove the registered IP address from a local storage of the IAP.

31. A computer program product comprising a non-transitory computer readable medium, the computer readable medium having computer-executable instructions for causing a device to perform steps recited in claim 1, when the computer-executable instructions are executed on a processing unit included in the device.

* * * * *